July 11, 1961 H. D. POST 2,991,955

REELS FOR TAPES AND THE LIKE

Filed June 5, 1958

INVENTOR.
Herman D. Post
BY
Michael S. Striker
ATTORNEY

United States Patent Office 2,991,955
Patented July 11, 1961

2,991,955
REELS FOR TAPES AND THE LIKE
Herman D. Post, 249—18 41st Ave., Little Neck, N.Y.
Filed June 5, 1958, Ser. No. 740,035
7 Claims. (Cl. 242—74)

The present invention relates to reels for tape and the like, and more particularly the present invention relates to self-threading reels.

Reels with complicated clamping mechanisms, perforation engaging means, or means for bending the end of a tape or the like by inserting it into a slot or slots in the hub of a reel have been used in the prior art, but these known devices damage or mar the end of the tape and they do not permit simple initial winding of tape.

Other known devices have means to push in the sides of the initial end of the tape so as to hold the tape in an attempt to eliminate the difficulty which exists in initially winding tape about the hub of a reel, but these devices do not solve the existing problem of initially winding the tape or the like.

One of the objects of the present invention is to provide a tape reel which permits the initial portion of a tape to be wound easily about the hub of the tape reel.

Another object of the present invention is to provide a tape reel which winds the initial portion of a tape without first affixing the initial portion of tape to the hub of the tape reel.

An additional object of the present invention is to provide a tape reel which will not cause creases in the tape to be wound.

A still further object of the present invention is to provide a tape reel which is of simple construction and which is made of relatively few inexpensive parts.

With the above objects in view, the present invention includes in a tape reel, a hub and at least one reel flange connected to the hub. According to the present invention projection means are mounted on the reel flange and cooperate with the reel flange and with the hub for winding a loose leading end of a tape on the reel when the tape is initially fed thereto.

The novel features which are considered as characteristic for the invention are set forth in particular in the appended claims. The invention itself, however, both as to its construction and its method of operation, together with additional objects and advantages thereof, will best understood from the following description of specific embodiments when read in connection with the accompanying drawings, in which:

Figure 1:
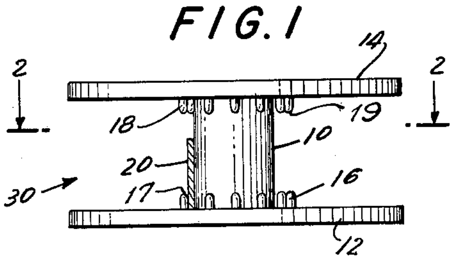
FIG. 1 is an elevational view of a tape reel constructed in accordance with the present invention and shown with a part of a tape.

Referring now to the drawings, there is shown in FIG. 1 a reel 30 having a hub 10, a bottom flange 12 connected to the bottom of the hub 10 and a flange 14 connected to the top of the hub 10.

A series of nibs 16 are integral with the bottom flange 12 projecting towards the top flange 14, and a similar series of nibs 18 are integral with the top flange 14 projecting towards the bottom flange 12. The nibs 16 have rounded free ends 17 and the nibs 18 have similar rounded ends 19.

Figure 2:
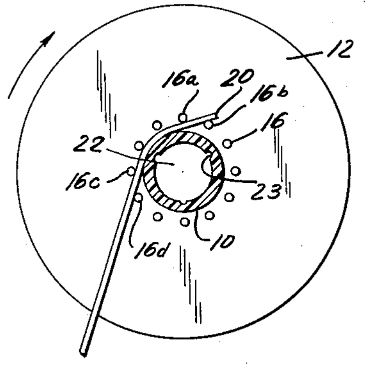
FIG. 2 is a sectional plan view, the section being taken along the line 2—2 of FIG. 1 in the direction of the arrows.

Referring to FIG. 2, center hole 22 has grooves 23 to provide a means for connecting the tape reel to the desired device.

The reel of the invention is used in the following manner:

Assuming that the reel is horizontally positioned so that the flange 12 is beneath the flange 14, then the user simply inserts the leading end of a tape 20, such as magnetic recording tape, into the space between the flanges with the tape located in a substantially vertical plane so that the lower side edge of the tape engages the upper surface of the flange 12, the leading end of the tape simply resting by gravity on the flange 12. The tape is inserted so that it extends past the hub, and in this way one portion of the tape will become haphazardly located between a pair of projections 16 and another portion of the tape will become haphazardly located between a second pair of the projections 16. Thus, FIG. 2 shows one portion of the tape between projections 16*a* and 16*b* and another portion of the tape between projections 16*c* and 16*d*. It will be noted that the part of the tape extending between the projections 16*a* and 16*c* is located directly next to the hub between the latter and the series of projections extending from projection 16*a* to projection 16*c*.

Figure 3:
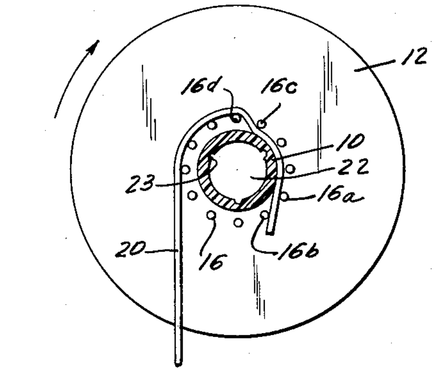
FIG. 3 is a view similar to FIG. 2 after rotation of the reel flange in the direction of the arrow of rotation.
Figure 4:
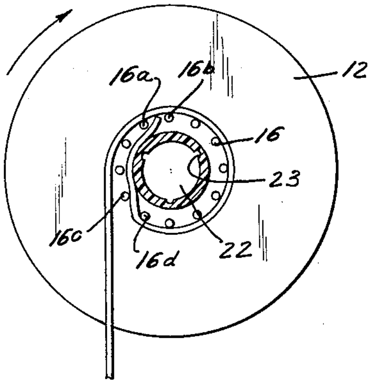
FIG. 4 is a view similar to FIG. 2 after more than one complete convolution of the reel flange in the direction of the arrow.
Figure 5:
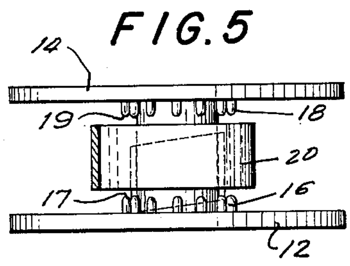
FIG. 5 is a view similar to FIG. 1 after several convolutions of the tape are wound on the reel.

Now the reel is turned slowly about its axis, by hand, for example, and the projections 16*a* and 16*c* together with the plurality of projections between projection 16*a* and 16*c* prevent the portion of the tape located between the projections and the hub from moving away from the hub so that when the reel has been turned through approximately 180° from the position of FIG. 2 to that of FIG. 3 the tape will be curved as indicated in FIG. 3. The continued turning of the reel through slightly more than 360° from the position of FIG. 2 to that of FIG. 4 in the direction of the arrows causes the leading end of the tape to become located between the hub and the beginning of a second convolution of the tape. Once the reel has been turned to the extent indicated by FIG. 4 the reel can be turned by the motor of the tape recorder, for example, and the resulting tension on the tape 20 will pull somewhat more than one convolution of the tape tightly against the hub, and at this time the lower edge of the additional convolutions of the tape simply slide off the projections 16 which push the tape upwardly so that it is now in secure engagement with the hub, and during continued rotation of the latter the tape is continuously wound in a conventional way on the hub. FIG. 5 shows several convolutions of the tape 20 on the hub of the reel.

The short length of the projections 16 and their rounded ends permit free movement of the tape into engagement with the hub, and the tape has a smaller width than the distance between projections 16 and 18 so that these projections do not interfere in any way with the conventional use of the reel. Of course, if the reel happens to be placed on the machine with the flange 14 below flange 12, then the projections 18 will function in the same way as the projections 16. In the event that the reel is used on a machine where the turning axis of the reel extends horizontally, then when the user inserts the leading end of the tape between the reel flanges he need only make certain that a side edge of the tape engages one of the flanges and that the tape rests on the hub, and then the reel will operate in the same way to automatically connect the tape with the reel.

Thus, it is unnecessary with the structure of the invention to carefully hold the leading end of the tape in engagement with the reel until more than one convolution of the tape is wound on the reel.

In the case of magnetic recording tape, the nibs 16 and 18 are preferably located 1/32 of an inch from the circumference of the hub, but this distance is not critical and the same operation can be carried out at other distances. With photographic film, for example, these sizes would be different. The nibs 16 and 18 are preferably of cylindrical configuration and have rounded ends 17 and 19 respectively. These nibs 16 and 18 are preferably 1/32 of an inch in length, but their function can be achieved with other sizes. These nibs 16 and 18 can be molded with or embossed on the flange in a known way.

It will be understood that each of the elements described above, or two or more together, may also find a useful application in other types of tape reels differing from the types described above.

While the invention has been illustrated and described as embodied in a self-threading tape reel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A self-threading tape reel comprising, in combination, a hub; a pair of reel flanges connected respectively to opposite ends of said hub; and a plurality of nibs mounted on the same side of each said reel flange as the hub and cooperating with said hub for winding a loose leading end of a tape on the reel when the tape is initially fed thereto, said nibs being substantially cylindrical and having rounded free ends, said free ends on one of said reel flanges being spaced from said free ends on said other reel flange a distance greater than the width of the tape to be wound thereon and said nibs on each flange being arranged along a circle which is concentric with the circumference of said hub, whereby when slightly more than one convolution of tape has been wound around the hub tension applied to the tape will permit the tape to slide off the rounded ends of the cylindrical shaped nibs and to be tightened on the hub for continued winding.

2. A self-threading reel comprising, in combination, a hub; a pair of reel flanges connected respectively to opposite ends of said hub; and a plurality of nibs on one of the reel flanges on the same side thereof as the hub and cooperating with said hub for winding a loose leading end of a tape on the reel when the tape is initially fed thereto, said nibs being substantially cylindrical and having round free ends, said free ends being spaced from the other flange a distance greater than the width of the tape to be wound thereon and said nibs being arranged along a circle which is concentric with the circumference of said hub, whereby when slightly more than one convolution of tape has been wound around the hub tension applied to the tape will permit the tape to slide off the rounded ends of the cylindrical shaped nibs and to be tightened on the hub for continued winding.

3. In combination, a self-threading reel having a hub, a pair of reel flanges connected respectively to opposite ends of said hub and a plurality of projecting means located on one of said reel flanges on the same side as said hub and spaced from each other, from the other of said reel flanges and from said hub; and a tape having a width smaller than the distance between said projecting means and said other reel flange and wound on said reel with one end thereof positioned between at least some of said projecting means and said hub and spaced from the said other reel flange.

4. In combination, a self-threading reel having a hub, a pair of reel flanges connected respectively to opposite ends of said hub and a plurality of projecting means located on one of said reel flanges on the same side as said hub and spaced from each other, from the other of said reel flanges and from said hub; and a tape having a width smaller than the distance between said projecting means and said other reel flange and initially wound on said reel with one end thereof positioned between at least some of said prejecting means and said hub and spaced from the said other reel flange so that when slightly more than one convolution of tape has been wound around said hub said tape will slide off said projecting means and wind around the said hub.

5. In combination, a self-threading reel having a hub, a pair of reel flanges connected respectively to opposite ends of said hub and a plurality of pins located on one of said reel flanges on the same side as said hub and spaced from each other, from the other of said reel flanges and from said hub; and a tape having a width smaller than the distance between said pins and said other reel flange and wound on said reel with one end thereof positioned between at least some of said pins and said hub and spaced from the said other reel flange.

6. In combination, a self-threading reel having a hub, a pair of reel flanges connected respectively to opposite ends of said hub and a plurality of pins located on one of said reel flanges on the same side as said hub and spaced from each other, from the other of said reel flanges and from said hub; and a tape having a width smaller than the distance between said pins and said other reel flange and wound on said reel with one end thereof positioned between at least some of said pins and said hub and spaced from the said other reel flange, said tape having a thickness smaller than the distance between said pins and said hub.

7. In combination, a self-threading reel having a hub, a pair of reel flanges connected respectively to opposite ends of said hub and a plurality of pins located on each of said reel flanges on the same side as said hub and spaced from each other, from the other of said reel flanges and from said hub; and a tape having a width smaller than the distance between the pins on one of said reel flanges and the pins of the other of said reel flanges and initially wound on said reel with one end thereof positioned between at least some of said pins of said one of said reel flanges and said hub and spaced from the said other reel flange so that when slightly more than one convolution of tape has been wound around said hub said tape will slide off said pins and wind around the said hub.

References Cited in the file of this patent

UNITED STATES PATENTS

| | | |
|---|---|---|
| 1,127,931 | Smith | Feb. 9, 1915 |
| 2,343,980 | Keene | Mar. 14, 1944 |
| 2,615,642 | Schulz | Oct. 28, 1952 |
| 2,753,127 | Yudin | July 3, 1956 |

FOREIGN PATENTS

| | | |
|---|---|---|
| 113,895 | Great Britain | Mar. 14, 1918 |